(No Model.)
W. C. QUIGLEY.
BALL BEARING.
No. 575,987. Patented Jan. 26, 1897.
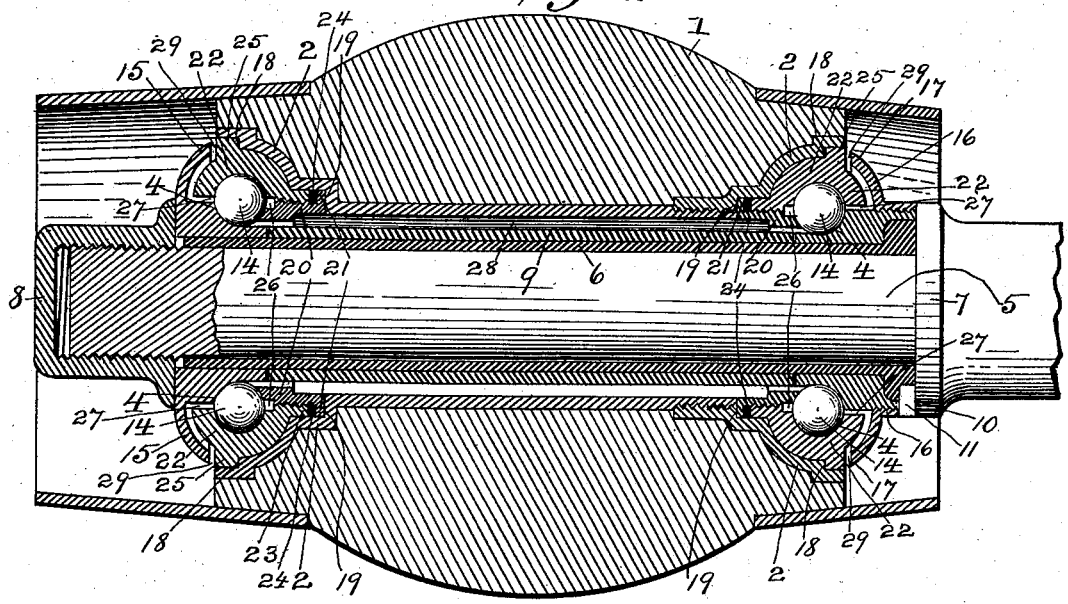
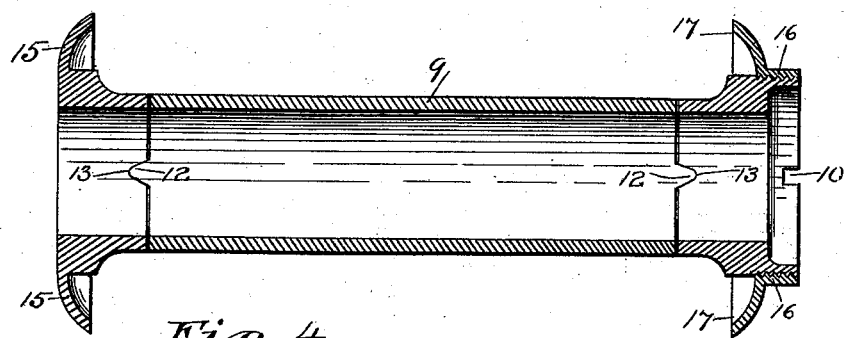
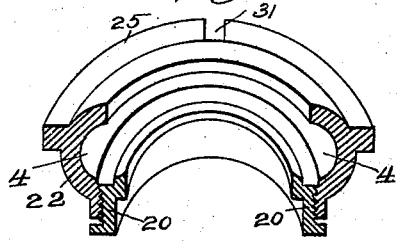
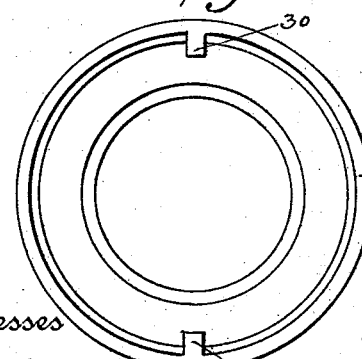
Witnesses
Jas. H. Blackwood
Albert B. Blackwood
Inventor
William C. Quigley
by David A. Gourick
Attorney

UNITED STATES PATENT OFFICE.

WILLIAM C. QUIGLEY, OF MARION, OHIO.

BALL-BEARING.

SPECIFICATION forming part of Letters Patent No. 575,987, dated January 26, 1897.

Application filed April 20, 1896. Serial No. 588,353. (No model.)

*To all whom it may concern:*

Be it known that I, WILLIAM C. QUIGLEY, a citizen of the United States, residing at Marion, in the county of Marion and State of Ohio, have invented certain new and useful Improvements in Ball-Bearings, of which the following is a specification.

My invention relates to improvements in ball-bearings for wheeled vehicles, and has for one of its objects to provide a ball-bearing for the endwise thrust of the axle, so that the balls tend to support the wheel in both its rotary and lateral movements by presenting to the outward circumference of the balls a surface corresponding thereto.

Another object of my invention is to provide a perfect race or channel in which the balls travel in their circuit around the journal on the axle-arm, avoiding thereby the usual wedge or cone shape now in use that requires a neat adjustment to be maintained to prevent the destruction of the balls.

Still another object of my invention is to provide a ball-bearing which may be applied, with slight changes thereof, to vehicles already constructed and which may be readily taken apart for cleaning or repairing.

These objects I accomplish in the manner and by the means hereinafter more fully described in detail, and particularly pointed out in the claims, reference being had to the accompanying drawings, in which the same numerals indicate like parts in all the figures of the drawings.

Figure 1 is a central sectional view of my improved ball-bearing device. Fig. 2 is a similar view of the journal. Figs. 3 and 4 are detail views. The hub 1 has the usual concentric bore therein, except that the bore is flared at each end thereof to receive the corresponding flared ends of a sleeve 2, fitted therein and which surrounds the ball-bearing chambers 3, having the ball-races 4 therein. The axle-arm 5 has fitted thereon a thimble 6, flared and shouldered at its inner end to fit over and abut against an annular flange or collar 7, formed on the axle. A nut 8 of the usual construction is fitted to the outer end of the axle. A journal 9 is similarly fitted over the thimble 6, its inner end being flared to correspond with the flared end of the inner end of the thimble, and is provided with a longitudinal slot 10 to receive a stud 11, secured in the collar 7 on the axle flush with the end of the journal 9, whereby the journal is prevented from turning on the thimble 6. The thimble may be more rigidly secured on the arm of the axle by expanding the thimble with heat prior to placing it thereon.

The thimble 6 may be dispensed with when all of the parts of the hub and axle-arm are especially designed for each other. In the latter case the journal 9 may be fitted directly to the axle-arm. When, however, the axle-arm is worn or is smaller than the interior diameter of the journal, the thimble 6, the thickness of its walls varying to correspond to axle-arms of varying sizes, may be used.

The journal 9 is formed in three sections, which consist of an outer, a middle, and an inner section. The ends of the middle section are each formed with V-shaped projections 12, diametrically opposite each other, which fit in correspondingly-shaped recesses or indentations 13, formed in the wall of the end of each section of the journal which is fitted thereto, a close joint being thus formed when the parts are brought together. By this construction the outer and inner ends of the journal 9 may be readily separated from the ball-chambers 3 when it is desired to take the latter apart for any purpose. This journal 9 is expanded circumferentially at a distance from each of its ends, the expansion conforming to the contour of a section of the exterior of the balls 14 and forms a part of the channel or race 4 wherein the balls run. The outer end of the journal 9 is provided with an annular flange 15, formed integral therewith on its outer circumference and curving back to protect the ball-chamber 3 at that end of the journal from dust or foreign matter. The inner end of the journal 9 has screw-threads formed on its outer circumference and has screwed thereon a collar 16, also formed with an inwardly-curved annular flange 17, the purpose of which is to protect the ball-chamber 3 at the same end of the journal from dust or foreign matter. This collar 16 may be formed integral with the journal. The sleeve 2 is fitted tightly in the hub 1 and has its ends flared to accommodate the ball-chambers 3 formed therein and therewith. This sleeve 2 is formed in two sections and is joined together at a point between the ball-chambers and near the inner ball-chamber by means of screw-threads formed on the outer circumference of the outer end, over which threaded end is fitted the inner end of said sleeve 2.

When the hub 1 is ready for the reception of the sleeve, each section of the latter is inserted in the corresponding ends of the hub and the parts of the sleeve are brought together and their flared circumferences forced into contact with the flared bore of the hub by turning the inner section of the end of the sleeve on the threaded end of the outer section. Annular shoulders 18 are formed on the inner sides of the flared parts of the sleeve 2, near each of the extreme ends thereof, and two annular shoulders 19 are formed between the ball-races 4 at the points where the flared portions of the sleeve begin. Bushing-rings 20, provided with annular flanges 21, formed at the ends thereof and at a right angle thereto, rest within the flared ends of the sleeve, with the flanges 21 thereon abutting against the annular shoulders 19, formed on the interior of the flared ends of the sleeve 2. The ends of the bushing-rings, together with the curved expansions at each end of the journal 9, form the channels or races 4, in which the balls 14 are supported and in which they run in contact with the journal 9.

Annular caps 22, provided with curved grooves on their inner surface corresponding to the contour of the upper half of the balls 14, their outer circumferences curved on the same lines as their inner circumferences, are fitted within the flared ends of the sleeve 2 and form the outer or upper portion of the races or channels for the balls to run in. These caps 22 are joined to the outer circumferences of the bushing-rings 20 by means of screw-threads formed on the inner circumference of a neck 23, formed integral therewith, the bushing-rings being correspondingly threaded. Between the end of the necks 23 and the flanges 21 of the bushing-rings thin washers are interposed at 24 to permit of the adjustment of the parts when the balls become worn. Annular shoulders 25 are formed on the outer circumference of the caps 22. The inner sides of these shoulders 25 abut against the shoulders 18, formed on the inner sides of the flared ends of the sleeve 2. The outer circumferences of the bushing-rings 20 are channeled or grooved at the ends adjacent to the balls 14, and the inner circumferences of the caps 22 are also channeled or grooved at a point opposite the channels or grooves in the bushing-rings, the grooves leaving spaces 26 at the sides of the ball-races 4. The edges of the caps 22 do not rest in direct contact with the circumference of the journal 9, a narrow space 27 intervening. There is also an intervening space 28 left between the inner side of the bushing-rings 20 and the journal. This space 28 is continuous between the inner side of the sleeve 2 and the exterior of the journal 9 from one ball-race to the other and permits of a circulation of air in and around the ball-races, thereby helping to prevent overheating of the balls and the parts of the ball-chamber with which the balls come in contact. The spaces 29, between the ends of the curved flanges formed on the ends of the journal and the annular rings or shoulders on the caps 22, are filled with elastic rings of felt or rubber, or of the two materials combined, the purpose of which is to more securely protect the ball-chambers from dust, dirt, or moisture.

The inner circumference of the sleeve 2 has formed thereon lugs 30 at each of its ends, which fit in corresponding slots 31 in the outer circumference of the annular shoulders 25, formed on the caps 22, whereby the parts comprising the upper or outer sides of the ball-chambers are held rigidly within the flared ends of the sleeve and compelled to turn therewith.

Having thus described my invention, what I claim as new, and desire to secure by Letters Patent, is—

1. The combination in an axle-bearing provided with antifriction devices and means for holding said antifriction devices therein, of a journal rigidly fixed on the arm of an axle and supporting said antfriction devices, said journal enlarged circumferentially in the form of a curve at each of its ends to form the outer side of races wherein said antifriction devices run, substantially as shown and described.

2. The combination in an axle-bearing provided with antifriction devices therein, of a supporting-journal having races formed therewith and thereon, said journal formed of annular sections and rigidly held together on the arm of an axle, substantially as shown and described.

3. The combination in an axle-bearing for vehicles consisting of antifriction devices supported in a sleeve fitted in a hub near each end of said hub and running in annular races therein, of a journal fixed to the arm of an axle, said journal supporting said antifriction devices in races formed near each end thereof and provided at each of its ends with annular flanges curving inward from the ends of said journal and forming housings for said antifriction devices at each end of said sleeve, substantially as shown and described.

4. The combination in an axle-bearing provided with antifriction devices supported in annular races in a sleeve inserted in the hub of a wheel, of a journal fitted to the arm of an axle, said journal formed in annular separable sections, a section at each end of said journal enlarged circumferentially to form the bottom and a part of the outer side of the annular races wherein antifriction devices run and are supported when said wheel is revolved and means for holding said journal in a fixed position on the arm of said axle, substantially as shown and described.

5. In a ball-bearing for vehicles, the combination in ball-bearing chambers, of circular ball-races formed on the circumference of a journal rigidly fixed to the arm of an axle, said races having bushing-rings adjustably supported in connection therewith and forming a part of the inner sides of said races, said bushing-rings having annular recesses in the ends of the walls thereof formed opposite the horizontal axis of said balls running in said races, substantially as shown and and described.

6. In a ball-bearing, the combination with a removable sleeve fitted in the hub of a wheel having its ends flared to receive ball-chambers therein, of a ball-chamber having a circular groove or race carrying balls fitted in the end of said sleeve, said balls supported in contact with a journal fitted to the arm of an axle, said journal rising at the outside of said balls to form a section of the side of the race wherein said balls run to support the lateral motion of said wheel revolving thereon, substantially as shown and described.

7. In a ball-bearing for vehicles, the combination with a sleeve flared at each of its ends and supported in the hub of a wheel and forming the roof of a ball-bearing chamber, of ball-chambers having annular ball-races therein corresponding in cross-section to the contour of the balls, said races formed by enlarging the circumference of the ends of a journal supported on the arm of an axle to form a part of the bottom and one-half of the outer side of said races, the top and inner side of said races formed with an annular cap provided with a neck projecting from the side thereof and of a bushing-ring fitted in said neck, substantially as shown and described.

8. The combination in an axle-bearing provided with antifriction-balls supported on a journal fixed to the arm of an axle and running in a race thereon, of a ball-chamber surrounding said balls consisting of a cap provided with a semicircular groove in the inner circumference thereof forming a race wherein said balls run, said cap provided with a neck projecting from the side thereof, said neck having fitted therein a bushing-ring for regulating the diameter of said ball-race, said bushing-ring provided with a flange abutting against an annular shoulder in a sleeve fitted in the hub of a wheel, said cap provided with an annular flange abutting against the end of said sleeve, and said cap and bushing-ring supported in said sleeve out of contact with said journal, substantially as shown and described.

9. The combination in an axle-bearing for vehicles provided with antifriction-balls and means for supporting said balls in a race formed on the circumference of a journal rigidly fixed on the arm of an axle, of a ball-bearing chamber supported in the end of a sleeve fixed in the hub of a wheel, said chamber formed of an annular cap provided with a circular groove on the inner circumference thereof, a neck projecting from the side of said cap, the inner circumference of said neck threaded and fitted to the outer circumference of a bushing-ring correspondingly threaded forming a part of said race, said cap and said ring held out of contact with said journal and provided with an annular recess opposite the horizontal axis of said balls in said race, substantially as shown and described.

In testimony whereof I hereto affix my signature in the presence of two witnesses.

WILLIAM C. QUIGLEY.

Witnesses:
  G. T. MASON,
  J. FRENCH CROW.